United States Patent
Chen et al.

(10) Patent No.: US 10,116,153 B2
(45) Date of Patent: Oct. 30, 2018

(54) MOBILE POWER SUPPLY CAPABLE OF CHARGING ITSELF AND ELECTRONIC DEVICE

(71) Applicant: Tianjin Synergy Groups Co., Ltd., Tianjin (CN)

(72) Inventors: Penghui Chen, Tianjin (CN); Xiaoshuang Yu, Tianjin (CN)

(73) Assignee: Tianjin Synergy Groups Co., Ltd., Tianjin (CN)

( * ) Notice: Subject to any disclaimer, the term of this patent is extended or adjusted under 35 U.S.C. 154(b) by 0 days.

(21) Appl. No.: 15/412,223

(22) Filed: Jan. 23, 2017

(65) Prior Publication Data

US 2018/0062415 A1  Mar. 1, 2018

(30) Foreign Application Priority Data

Aug. 24, 2016  (CN) .......................... 2016 1 0714564

(51) Int. Cl.
*H02J 7/00* (2006.01)
*H02J 7/04* (2006.01)
(Continued)

(52) U.S. Cl.
CPC .......... *H02J 7/0045* (2013.01); *H02J 7/0021* (2013.01); *H02J 7/0054* (2013.01); *H02J 7/045* (2013.01);
(Continued)

(58) Field of Classification Search
CPC .......... H02J 7/025; H02J 7/045; H02J 7/0045; H02J 7/0021; H02J 7/0054; H02J 50/10; H02J 2007/0062
See application file for complete search history.

(56) References Cited

U.S. PATENT DOCUMENTS 5,992,155 A * 11/1999 Kobayashi .............. G06F 1/203
165/104.33
6,788,033 B2 * 9/2004 Vinciarelli .......... H02M 3/1582
323/225

(Continued)

FOREIGN PATENT DOCUMENTS

CN  201207578 Y  3/2009
CN  202127260 U  1/2012
(Continued)

OTHER PUBLICATIONS

International Search Report Form PCT/ISA/210, International Application No. PCT/CN2016/104172, p. 1-4, International Filing Date Nov. 1, 2016, dated Mar. 30, 2017.
(Continued)

*Primary Examiner* — Naum B Levin
(74) *Attorney, Agent, or Firm* — Bond Schoeneck & King, PLLC; George McGuire

(57) ABSTRACT

A mobile power supply may include a charging and discharging interface, a charging and discharging circuit, a central processor, and a battery pack. The charging and discharging circuit may be configured to adjust a voltage inputted to the battery pack to charge the battery pack when the voltage inputted to the battery pack is not matched with a voltage of the battery pack, or configured to adjust a voltage output to the electronic device to charge the electronic device when the voltage outputted to the electronic device is not matched with a rated voltage of the electronic device. The central processor may be configured to control the charging and discharging circuit to charge the battery pack, supply power to or charge the electronic device.

12 Claims, 3 Drawing Sheets

(51) Int. Cl.
*H02J 7/02* (2016.01)
*H02J 50/10* (2016.01)

(52) U.S. Cl.
CPC ............... *H02J 7/025* (2013.01); *H02J 50/10* (2016.02); *H02J 2007/0062* (2013.01)

(56) References Cited

U.S. PATENT DOCUMENTS

| | | | | |
|---|---|---|---|---|
| 6,819,011 | B2* | 11/2004 | Kernahan | H02M 3/157 |
| | | | | 307/151 |
| 7,117,044 | B2* | 10/2006 | Kocher | G05B 11/32 |
| | | | | 700/34 |
| 7,633,263 | B2* | 12/2009 | Toya | H02J 50/10 |
| | | | | 320/108 |
| 7,948,207 | B2* | 5/2011 | Scheucher | B60L 8/00 |
| | | | | 320/104 |
| 8,130,499 | B2* | 3/2012 | Ohnishi | H01L 23/053 |
| | | | | 174/16.3 |
| 8,228,023 | B2* | 7/2012 | Sather | H01M 2/0275 |
| | | | | 29/623.1 |
| 8,531,833 | B2* | 9/2013 | Diebel | G06F 1/1628 |
| | | | | 361/679.41 |
| 9,093,848 | B2* | 7/2015 | Miller | H02J 7/0027 |
| 9,250,281 | B2* | 2/2016 | Tran | G01R 31/002 |
| 9,321,433 | B2* | 4/2016 | Yin | B60L 11/1801 |
| 9,380,988 | B2* | 7/2016 | Kitano | A61B 6/4283 |
| 2010/0171465 | A1* | 7/2010 | Seal | G03G 15/5004 |
| | | | | 320/114 |
| 2014/0132206 | A1* | 5/2014 | Zhu | H02J 50/12 |
| | | | | 320/108 |
| 2014/0312691 | A1* | 10/2014 | Doljack | H02J 7/0036 |
| | | | | 307/29 |
| 2015/0077042 | A1* | 3/2015 | Seidel | H05K 7/20145 |
| | | | | 320/107 |
| 2015/0357840 | A1* | 12/2015 | Okada | H01M 10/441 |
| | | | | 320/128 |
| 2016/0043585 | A1* | 2/2016 | Zawadzki | H02J 7/0044 |
| | | | | 320/114 |
| 2016/0099588 | A1* | 4/2016 | Bae | H02J 7/0024 |
| | | | | 320/107 |
| 2016/0285289 | A1* | 9/2016 | Arends | H02J 7/0054 |
| 2017/0222444 | A1* | 8/2017 | Hijazi | H02J 3/387 |
| 2017/0231058 | A1* | 8/2017 | Sadwick | H05B 33/0896 |
| 2018/0034292 | A1* | 2/2018 | Yin | H02J 7/0036 |

FOREIGN PATENT DOCUMENTS

| | | |
|---|---|---|
| CN | 202759261 U | 2/2013 |
| CN | 204465081 U | 7/2015 |
| CN | 105515137 A | 4/2016 |
| CN | 205489659 U | 8/2016 |
| JP | 2005057826 A | 3/2005 |

OTHER PUBLICATIONS

Documents from the CN Patent Office, dated Mar. 14, 2018.

* cited by examiner

MOBILE POWER SUPPLY CAPABLE OF CHARGING ITSELF AND ELECTRONIC DEVICE

CROSS-REFERENCE TO RELATED APPLICATIONS

This application claims priority to Chinese patent application No. 201610714564.0, filed on Aug. 24, 2016, which is incorporated by reference herein in its entirety.

TECHNICAL FIELD

The present disclosure relates to the technical field of power supplies, and particularly relates to a mobile power supply.

BACKGROUND

With increasing development of science and technology, more and more electronic products become a mainstream in a market or lives of people. It is well known that, electronic devices, such as a mobile phone, a computer and a digital camera, require to be charged when in use. Convenience can be provided to a user by charging the above electronic devices with a mobile power supply, thereby preventing a situation that the electron device has low battery when the user goes out.

A current mobile power supply is provided with a charging interface and a discharging interface. The mobile power supply is charged by an external charging power supply through the charging interface when the mobile power supply has low battery. Electronic devices are charged by the mobile power supply through the charging interface when different electronic devices are required to be charged. In the existing art, a charging circuit matched with the charging interface and a discharging circuit matched with the discharging interface need to be designed in an internal circuit of the mobile power supply. Moreover, the charging circuit needs to meet a requirement that different charging power supplies should be matched with a battery pack in the mobile power supply, and the discharging circuit needs to meet a requirement that the battery pack should be matched with different electronic devices. Therefore, the circuit design is relatively complicated, and the cost is increased.

SUMMARY

In view of this, embodiments of the present disclosure provide a mobile power supply capable of charging different electronic devices and charging the mobile power supply itself through a charging and discharging interface and a charging and discharging circuit matched with the charging and discharging interface, thereby simplifying the circuit, and reducing the cost.

The embodiments of the present disclosure provide a mobile power supply, including a charging and discharging interface, a charging and discharging circuit, a central processor and a battery pack, a first end of the charging and discharging interface is connected to a first end of the charging and discharging circuit, and the charging and discharging interface is configured to connect one of an external charging power supply and an electronic device requiring to be charged or supplied with power;

a second end of the charging and discharging circuit is connected to an anode of the battery pack, and the charging and discharging circuit is configured to perform one of the following:

adjusting a voltage inputted to the battery pack by the charging power supply to charge the battery pack when the voltage inputted to the battery pack is not matched with a voltage of the battery pack, and adjusting a voltage output to the electronic device by the battery pack to supply power to or charge the electronic device when the voltage output to the electronic device is not matched with a rated voltage of the electronic device;

a cathode of the battery pack is connected to a third end of the charging and discharging circuit; and a fourth end of the charging and discharging circuit is connected to a second end of the charging and discharging interface; and the central processor is connected to a fifth end of the charging and discharging circuit, and configured to control the charging and discharging circuit to perform one of charging the battery pack, supplying power to the electronic device, and charging the electronic device.

According to the mobile power supply provided by the embodiments of the present disclosure, through the charging and discharging interface and the charging and discharging circuit, the battery pack in the mobile power supply can charge or supply power to different external electronic devices and the external charging power supply can charge the battery pack, thereby simplifying the circuit, reducing the cost, and increasing the practicability.

BRIEF DESCRIPTION OF DRAWINGS

Other features, objectives and advantages of the present disclosure will become more apparent by reading detailed description made to nonrestrictive embodiments by referring to the following drawings.

DETAILED DESCRIPTION

Figure 1:
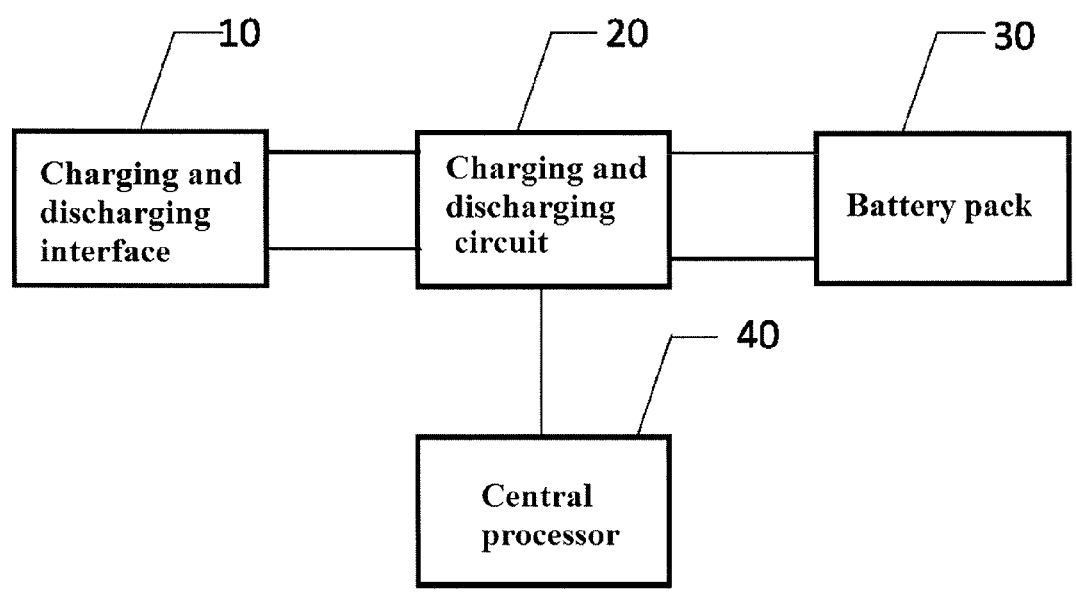
FIG. 1 is a structural diagram showing a mobile power supply provided by Embodiment I of the present disclosure.

Detailed description is further made to the present disclosure below in combination with drawings and embodiments. It can be understood that, the specific embodiments described herein are only used for explaining the present disclosure, rather than limiting the present disclosure. In addition, it should also be noted that, merely parts related to the present disclosure, rather than all contents are illustrated in the drawings, so as to facilitate the description.

Embodiment I

FIG. 1 is a structural diagram showing a mobile power supply provided by Embodiment I of the present disclosure. As shown in FIG. 1, the mobile power supply includes: a charging and discharging interface 10, a charging and discharging circuit 20, a battery pack 30 and a central processor 40.

A first end of the charging and discharging interface 10 is connected to a first end of the charging and discharging circuit 20, and the charging and discharging interface 10 is configured to connect an external charging power supply or connect an electronic device requiring to be charged or supplied with power. The charging and discharging interface 10 can be designed as a USB interface, or can also be designed as an interface in other forms. As different electronic devices have different interfaces, the charging and discharging interface can be connected to different electronic devices through different data cables when connected to different electronic devices, thereby charging different electronic devices. In the present embodiment, the charging and discharging interface can be connected to a connecting line with three sockets, a socket at one end of the connecting line is connected to the charging and discharging interface, and sockets at another two ends of the connecting line are matched with the interface of the electronic device and the charging power supply respectively. Through a charging and discharging interface, both the charging power supply and the electronic device requiring to be charged or supplied with power can be connected, thereby simplifying the structure of the mobile power supply, and reducing the cost.

A second end of the charging and discharging circuit 20 is connected to an anode of the battery pack 30, and the charging and discharging circuit 20 is configured to adjust a voltage inputted to the battery pack 30 by the charging power supply to charge the battery pack 30 when the voltage inputted to the battery pack 30 is not matched with a voltage of the battery pack 30, or configured to adjust a voltage outputted to the electronic device by the battery pack 30 to charge or supply power to the electronic device when the voltage outputted to the electronic device is not matched with a rated voltage of the electronic device. A cathode of the battery pack 30 is connected to a third end of the charging and discharging circuit 20, and a fourth end of the charging and discharging circuit 20 is connected to a second end of the charging and discharging interface 10.

Specifically, in the present embodiment, when the battery pack 30 in the mobile power supply is charged or supplied with power by the charging power supply, and the voltage inputted to the battery pack 30 by the charging power supply is greater than the voltage of the battery pack 30 and the difference between the voltage inputted to the battery pack 30 by the charging power supply and the voltage of the battery pack 30 is relatively large, the voltage inputted to the battery pack 30 is reduced through the charging and discharging circuit 20 to be matched with the voltage of the battery pack 30, that is, the difference between the voltage inputted to the battery pack 30 and the voltage of the battery pack 30 is in a first preset range, so as to charge the battery pack 30, thereby avoiding the damage to the battery pack 30. Similarly, when the voltage inputted to the battery pack 30 by the charging power supply is less than the voltage of the battery pack 30, the voltage inputted to the battery pack 30 is increased through the charging and discharging circuit 20 to be matched with the voltage of the battery pack 30, that is, the voltage inputted to the battery pack 30 is greater than the voltage of the battery pack 30, and the difference between the voltage inputted to the battery pack 30 and the voltage of the battery pack 30 being within the first preset range, so as to charge or supply power to the battery pack 30. Therefore, the battery pack 30 in the mobile power supply can be charged or supplied with power by different charging power supplies through the charging and discharging circuit 20, and the charging power supply can be a solar cell or an energy storage device capable of converting wind energy into electric energy and the like. The voltage inputted to the charging and discharging interface by the external charging power supply connected with the charging and discharging interface can be 4.5V-80V through the charging and discharging circuit.

When an external electronic device is charged or powered by the battery pack 30 and the voltage outputted to the electronic device by the battery pack 30 is much greater than the rated voltage of the electronic device, the voltage outputted to the electronic device is reduced through the charging and discharging circuit 20, so that the voltage outputted to the electronic device by the battery pack 30 is matched with the rated voltage of the electronic device, that is, the difference between the voltage to the electronic device outputted by the battery pack 30 and the rated voltage of the electronic device is in a second preset range, thereby charging the electronic device. Similarly, when the voltage outputted to the electronic device by the battery pack 30 is less than the rated voltage of the electronic device, the voltage outputted to the electronic device is increased through the charging and discharging circuit 20, so that the voltage outputted to the electronic device by the battery pack 30 is matched with the rated voltage of the electronic device, that is, the voltage outputted to the electronic device by the battery pack 30 is greater than the rated voltage of the electronic device, and the difference between the voltage outputted to the electronic device and the rated voltage of the electronic device is in the second preset range, so as to charge the electronic device. Therefore, through the charging and discharging circuit 20, the battery pack 30 in the mobile power supply is capable of charging or powering different electronic devices. Through the charging and discharging circuit 20, the voltage outputted to the electronic device by the battery pack 30 is in the range of 0V-80V, and the electronic device can be a mobile phone, a tablet computer, a notebook computer and the like. In the present embodiment, the mobile power supply is enabled to charge storage battery of an automobile, battery of an electric vehicle and others through the charging and discharging circuit.

Therefore, through the charging and discharging interface and the charging and discharging circuit, the battery pack in the mobile power supply is enabled to charge or power different external electronic devices, and the external charging power supply is enabled to charge the battery pack, thereby simplifying the circuit structure of the mobile power supply, reducing the cost, and improving the practicability.

In the present embodiment, the central processor 40 is connected to a fifth end of the charging and discharging circuit 20, and is configured to control the charging and discharging circuit 20 to charge the battery pack 30, or charge or supply the electronic device with power.

Specifically, when the battery pack 30 in the mobile power supply is charged by the external charging power and the voltage inputted to the battery pack 30 by the charging power supply is not matched with the voltage of the battery pack 30, the central processor 40 controls the buck or boost of the charging and discharging circuit 20. When an external electronic device is charged by the battery pack 30 in the mobile power supply and the voltage outputted to the electronic device by the battery pack 30 is not matched with the rated voltage of the electronic device, the central processor 40 controls the buck or boost of the charging and discharging circuit 20.

According to the mobile power supply provided by the present embodiment, through the charging and discharging interface and the charging and discharging circuit, the battery pack in the mobile power supply is enabled to charge different external electronic devices, and the external charging power supply is enabled to charge the battery pack, thereby simplifying the circuit, reducing the cost, and improving the practicability.

Embodiment II

Figure 2:
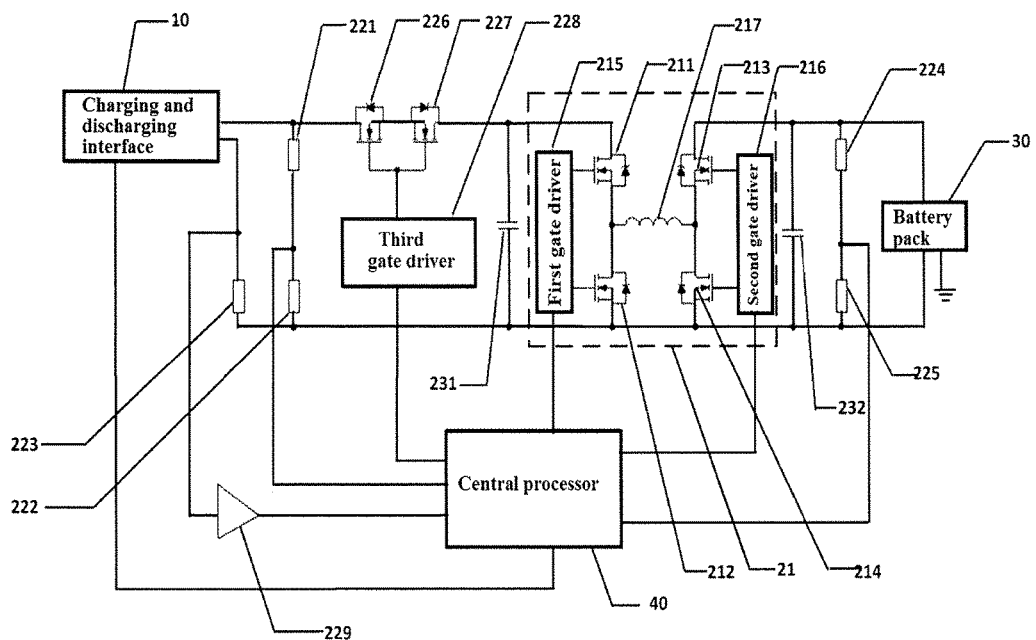
FIG. 2 is a structural diagram showing a circuit of a mobile power supply provided by Embodiment II of the present disclosure.

FIG. 2 is a structural diagram showing a circuit of a mobile power supply provided by Embodiment II of the present disclosure. Based on the above Embodiment I, optionally, the charging and discharging circuit includes a buck-boost circuit 21, as shown in FIG. 2.

The buck-boost circuit 21 includes a first transistor 211, a second transistor 212, a third transistor 213, a fourth transistor 214, a first gate driver 215, a second gate driver 216 and an inductor 217.

The first transistor 211 has a drain electrode connected to the first end of the charging and discharging interface 10, a source electrode connected to a first end of the inductor 217 and a drain electrode of the second transistor 212 respectively, and a gate electrode connected to a first output end of the first gate driver 215. The second transistor 212 has a source electrode connected to the cathode of the battery pack 30, and a gate electrode connected to a second output end of the first gate driver 215. A second end of the inductor 217 is connected to a source electrode of the third transistor 213 and a drain electrode of the fourth transistor 214 respectively. The third transistor 213 has a drain electrode connected to the anode of the battery pack 30, and a gate electrode connected to a first output end of the second gate driver 216. The fourth transistor 214 has a source electrode connected to the cathode of the battery pack 30, and a gate electrode connected to a second output end of the second gate driver 216. The cathode of the battery pack 30 is grounded. The central processor 40 is connected to an input end of the first gate driver 215 and an input end of the second gate driver 216 respectively, and further configured to control, through the first gate driver 215, on-off of the first transistor 211 and the second transistor 212, and control, through the second gate driver 216, on-off of the third transistor 213 and the fourth transistor 214.

Based on the above embodiment, as show in FIG. 2, the charging and discharging circuit further includes a control circuit.

The control circuit includes a first resistor 221, a second resistor 222, a third resistor 223, a fourth resistor 224, a fifth resistor 225, a fifth transistor 226, a sixth transistor 227 and a third gate driver 228.

In the present embodiment, the first resistor 221 has a first end connected to the first end of the charging and discharging interface 10, and a second end connected to a first end of the second resistor 222. A second end of the second resistor 222 is connected to a first end of the third resistor 223 and the cathode of the battery pack 30 respectively. A second end of the third resistor 223 is connected to the second end of the charging and discharging interface 10.

Both of the fifth transistor 226 and the sixth transistor 227 are arranged between the first end of the charging and discharging interface 10 and the drain electrode of the first transistor 211. The fifth transistor 226 has a drain electrode connected to the first end of the charging and discharging interface 10 and the first end of the first resistor 221 respectively, and a source electrode connected to a source electrode of the sixth transistor 227. A drain electrode of the sixth transistor 227 is connected to the drain electrode of the first transistor 211. The third gate driver 228 has an input end connected to the central processor 40, and an output end connected to a gate electrode of the fifth transistor 226 and a gate electrode of the sixth transistor 227 respectively. The fourth resistor 224 has a first end connected to the anode of the battery pack 30, and a second end connected to a first end of the fifth resistor 225. A second end of the fifth resistor 225 is connected to the cathode of the battery pack 30 and the second end of the second resistor 222 respectively. The central processor 40 is connected to the second end of the first resistor 221, the second end of the third resistor 223 and the second end of the fourth resistor 224 respectively, and the central processor 40 is further configured to collect a first voltage signal at the second end of the first resistor 221, a current signal at the second end of the third resistor 223 and a second voltage signal at the transmit end of the fourth resistor 224 and control the third gate driver 228 according to the first voltage signal, the current signal and the second voltage signal when the battery pack 30 is charged by the charging power supply, so as to control the fifth transistor 226 and the sixth transistor 227 to be turned on or turned off. The central processor 40 is further configured to collect a second voltage signal at the second end of the fourth resistor 224 and control the third gate driver 228 according to the second voltage signal when the electronic device is charged or powered by the battery pack 30, so as to control on-off of the sixth transistor 227 and the fifth transistor 226. An amplifier 229 is arranged between the second end of the charging and discharging interface 10 and the central processor 40, and configured to amplify the current signal.

As shown in FIG. 2, when the charging and discharging interface 10 is connected to an external charging power supply, and the voltage inputted to the battery pack 30, through the charging and discharging interface 10, by the charging power supply is different, the first voltage signal collected by the central processor 40 at the second end of the first resistor 221 and the current signal collected by the central processor 40 at the second end of the third resistor 223 are different, therefore, the voltage inputted to the battery pack 30 can be determined by the central processor 40 according to the first voltage signal and the current signal collected. As the voltage of the battery pack 30 is different, the voltage signal of the fourth resistor 224 at the second end thereof is also different when the battery pack 30 discharges. Therefore, the voltage of the battery pack 30 may be determined according to the second voltage signal of the second end of the fourth resistor 224. A size relationship between the voltage inputted to the battery pack 30 and the voltage of the battery pack 30 is determined by the central processor 40 according to the first voltage signal and the second voltage signal collected, thereby controlling the buck or boost of the buck-boost circuit 21, and realizing the charging of the battery pack 30. Alternatively, the central processor 40 controls the buck or boost of the buck-boost circuit 21 according to the size relationship of the first voltage signal and the second voltage signal and the product of the first voltage signal and the current signal, thereby realizing the charging of the battery pack 30.

It should be noted that, in the embodiment of the present disclosure, the buck or boost of the buck-boost circuit is exemplarily controlled by the central processor according to the first voltage signal, the current signal and the second voltage signal. However, the present embodiment is merely an example, and in other embodiments of the present disclosure, the central processor can also control the buck or boost of the buck-boost circuit in other manners. For example, the central processor can control the buck-boost circuit according to the size relationship of the input voltage of the buck-boost circuit and a set value. Specifically, the central processor controls the buck-boost circuit to drop voltage when the input voltage of the buck-boost circuit is greater than the set value, and the central processor controls the buck-boost circuit to boost voltage when the input voltage of the buck-boost circuit is less than the set value.

Specifically, in the case that the battery pack 30 is charged by the external charging power supply, the central processor 40 controls, through the third gate driver 228, the fifth transistor 226 and the sixth transistor 227 to be turned on if a voltage value of the first voltage signal, collected by the central processor 40, at the second end of the first resistor 221 is greater than that of the second voltage signal at the second end of the fourth resistor 224. The current signal inputted by the charging power supply flows through the fifth transistor 226 and the sixth transistor 227, and then, flows into the buck-boost circuit 21. The fifth transistor 226 and the sixth transistor can be controlled to be turned on in the following mode: the central processor 40 controls the fifth transistor 226 and the sixth transistor 227 to be turned on when the voltage value of the first voltage signal at the second end of the first resistor 221 is less than that of the second voltage signal at the second end of the fourth resistor 224 and a power calculated according to the product of the first voltage signal at the second end of the first resistor 221 and the current signal at the second end of the third resistor 223 is less than a first preset value. The first preset value is determined by prestored parameter information of the battery pack.

The central processor 40 controls the first gate driver 215 to transmit a Pulse Width Modulation (PWM) signal to the first transistor 211 and the second transistor 212 respectively, so as to control the first transistor 211 and the second transistor 212 to be turned on alternately. Meanwhile, the third transistor 213 is controlled to be in on state and the fourth transistor 214 is controlled to be in off state. When the first transistor 211 is turned on, the current signal inputted by the charging power supply flows through the first transistor 211, the inductor 217 and the third transistor 213 to enter the anode of the battery pack 30, and a part of energy is stored in the inductor 217. When the first transistor 211 is cut off, the energy stored in the inductor 217 generates a current through the third transistor 213, the battery pack 30 and the second transistor 212 to charge the battery pack 30.

In the present embodiment, as shown in FIG. 2, in the case that the battery pack 30 is charged by the external charging power supply, the central processor 40 controls, through the third gate driver 228, the fifth transistor 226 and the sixth transistor 227 to be turned on if the voltage value of the first voltage signal at the second end of the first resistor 221, collected by the central processor 40, is less than that of the second voltage signal at the second end of the fourth resistor 224. The current signal inputted by the charging power supply flows through the fifth transistor 226 and the sixth transistor 227, and then, flows into the buck-boost circuit 21. The central processor 40 controls the first gate driver 215 to transmit a high level signal to the first transistor 211, so as to control the first transistor 211 to be turned on. Meanwhile, the central processor 40 controls the second gate driver 216 to transmit a PWM signal to the third transistor 213 and the fourth transistor 214 respectively, so as to control the fourth transistor 214 and the third transistor 213 to be turned on alternately. When the fourth transistor 214 is turned on, the current flows through the inductor 217, and the inductor 217 stores the energy. When the fourth transistor 214 is turned off and the third transistor 213 is turned on, the inductor 217 releases the energy, the sum of an electromotive force generated and the voltage inputted by the charging power supply is greater than the voltage of the battery pack 30, and the current signal flows into the battery pack 30, thereby realizing the boost of the voltage inputted by the charging power supply.

Moreover, a PID (Proportion Integration Differentiation) closed-loop automatic control is carried out on the voltage value of the first voltage signal, collected by the central processor 40, at the second end of the first resistor 221 and the current value of the current signal, collected by the central processor 40, at the second end of the third resistor 223, thereby charging the battery with constant current and constant voltage.

In the present embodiment, as shown in FIG. 2, when the charging and discharging interface 10 is connected to the external electronic device, the second voltage signal collected by the central processor 40 at the second end of the fourth resistor 224 is different if the voltage inputted to the electronic device, through the charging and discharging interface 10, by the batter pack 30 is different. Therefore, the central processor 40 can control the buck or boost of the buck-boost circuit according to the second voltage signal collected, thereby realizing the charging or power supplying of the electronic device.

Specifically, when the external electronic device is charged or supplied with power by the battery pack 30, the central processor 40 controls, through the third gate driver 228, the sixth transistor 227 and the fifth transistor 226 to be turned on if the voltage value of the second voltage signal collected by the central processor 40 at the second end of the fourth resistor 224 is greater than a target voltage to be output. When the external electronic device is charged or supplied with power by the battery pack 30, the sixth transistor 227 and the fifth transistor 226 can also be controlled by the following manners: the central processor 40 controls the sixth transistor 227 and the fifth transistor 226 to be turned on if the voltage value of the second voltage signal at the second end of the fourth resistor 224 is greater than the target voltage to be output and a power value calculated from the product of the voltage value of the first voltage signal at the second end of the first resistor and the current value of the current signal at the second end of the third resistor is not greater than a second preset value. Both the second preset value and the target voltage to be output are determined by parameter information of the electronic device acquired by the central processor, where the electronic device is connected to the charging and discharging interface.

The central processor 40 controls, through the second gate driver 216, the third transistor 213 and the fourth transistor 214 to be turned on alternatively, while the first transistor 211 is in on state and the second transistor 212 is in off state. When the third transistor 213 is turned on and the fourth transistor 214 is cut off, the current signal flows through the third transistor 213, the inductor 217, the first transistor 211, the sixth transistor 227, the fifth transistor 226 and the charging and discharging interface 10 from the battery pack 30 respectively, and the inductor 217 stores the energy. When the third transistor 213 is cut off and the fourth transistor 214 is turned on, the energy stored on the inductor 217 is released, the current signal flows through the first transistor 211, the sixth transistor 227, the fifth transistor 226 and the charging and discharging interface 10 from the inductor 217 respectively, thus, the electronic device is charged or supplied with power, and the voltage outputted to the electronic device by the battery pack 30 is reduced.

It should be stated that, when the external electronic device is charged or supplied with power by the battery pack, a matching relation between the voltage outputted to the electronic device by the battery pack and the rated voltage of the electronic device can also be determined through other manners.

If the voltage value of the second voltage signal collected by the central processor 40 at the second end of the fourth resistor 224 is less than the target voltage to be output, the central processor 40 controls, through the second gate driver 216, the third transistor 213 to be turned on and the fourth transistor 214 to be cut off, and controls, through the first gate driver 215, the second transistor 212 and the first transistor 211 to be turned on alternatively. When the second transistor 212 is turned on and the first transistor 211 is cut off, the current signal passes through the third transistor 213, the inductor 217 and the second transistor 212 from the battery pack 30 respectively, thereby realizing the energy storage of the inductor 217. When the second transistor 212 is cut off and the first transistor 211 is turned on, the inductor 217 releases the energy and generates electromotive force, the electromotive force generated by the inductor 217 is superimposed with the voltage of the battery pack 30 to output to the external electronic device, and the sum of the electromotive force generated by the inductor 217 and the voltage of the battery pack 30 is greater than the rated voltage of the electronic device (the difference between the sum of the electromotive force generated by the inductor 217 and the voltage of the battery pack 30 and the rated voltage of the electronic device is in the second preset range). The current signal flows through the third transistor 213, the inductor 217, the first transistor 211, the sixth transistor 227, the fifth transistor 226 and the charging and discharging interface 10 from the battery pack 30 respectively, thereby realizing the charging or power supplying of the electronic device.

Moreover, a PID (Proportion Integration Differentiation) closed-loop automatic control is carried out on the voltage value of the first voltage signal collected by the central processor 40 at the second end of the first resistor 221 and the current value of the current signal collected by the central processor 40 at the second end of the third resistor 223, thereby powering or charging the electronic device with constant current and constant voltage.

Thus, through the buck-boost circuit, the voltage inputted to the battery pack may be boosted or bucked, or the voltage output to the electronic device by the battery pack may also be boosted or buckedted. The battery pack may be protected through the control circuit, thereby avoiding the damage to the battery pack due to too-high charging power supply, and the buck-boost circuit may also be controlled through the control circuit.

As shown in FIG. 2, based on the above embodiment, the charging and discharging circuit further includes a voltage stabilizing component. The voltage stabilizing component includes a first capacitor 231 and a second capacitor 232. The first capacitor 231 has a first end connected to the drain electrode of the sixth transistor 227 and the drain electrode of the first transistor 211 respectively, and a second end connected to the cathode of the battery pack 30. The second capacitance 232 has a first end connected to the anode of the battery pack 30, the first end of the fourth resistor 224 and the drain electrode of the third transistor 213 respectively, and a second end connected to the cathode of the battery pack 30. Through providing the voltage stabilizing component, the charging and discharging circuit is kept stable, thereby avoiding adverse effects due to unstable signal.

Based on the above embodiment, as shown in FIG. 2, the central processor 40 is connected to a third end of the charging and discharging interface 10, and is configured to acquire parameter information of an external electronic device when the external electronic device is charged by the battery pack 30, and identify a category of the electronic device according to the parameter information. The acquired parameter information of the electronic device can be rated current, rated voltage and other information of the electronic device. The category of the electronic device is identified through the acquired parameter information, and some preset values in the central processor can also be set through the parameter information.

According to the mobile power supply provided by the present embodiment, through the buck-boost circuit, the battery pack or the electronic device may also be charged when the voltage of the external charging power supply or the electronic device is not matched with the rated voltage of the battery pack. Moreover, the battery pack in the mobile power supply can be protected through the control circuit, and the charging and discharging circuit can be kept stable through the voltage stabilizing component.

Embodiment III

Figure 3:
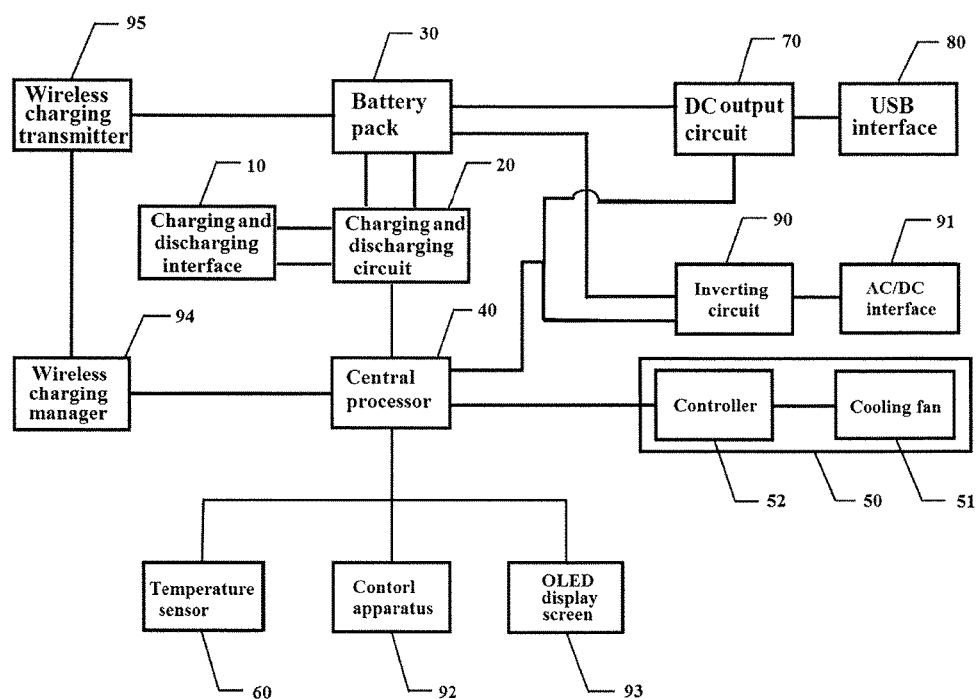
FIG. 3 is a structural diagram showing a mobile power supply provided by Embodiment III of the present disclosure.

FIG. 3 is a structural schematic diagram showing a mobile power supply provided by Embodiment III of the present disclosure. The mobile power supply includes a charging and discharging interface 10, a charging and discharging circuit 20, a battery pack 30 and a central processor 40. Based on the above embodiment, the mobile power supply further includes a cooling device 50 and a temperature sensor 60.

The cooling device 50 is configured to cool the mobile power supply. The temperature sensor 60 is connected to the central processor 40, and configured to detect an internal temperature of the mobile power supply and transmit the detected temperature signal to the central processor 40. The central processor 40 is further configured to control the cooling device 50 according to the received temperature signal. Optionally, the cooling device 50 includes a cooling fan 51 and a controller 52. The controller 52 is connected to the central processor 40, and configured to receive a rotating speed control signal transmitted by the central processor 40 and control a rotating speed of the cooling fan 52 according to the rotating speed control signal.

In the present embodiment, specifically, if a temperature value of the temperature signal received by the central processor 40 is relatively big, the rotating speed of the cooling fan 52 is controlled to be increased through the controller 51; conversely, the rotating speed of the cooling fan 52 is controlled to be reduced.

In the present embodiment, optionally, the charging and discharging circuit is integrated on a circuit board, and the cooing device further includes a heat-conducting rubber pad (not showed in the drawings). The heat-conducting rubber pad is arranged on the battery pack and the circuit board. The heat dissipation of the battery pack and the circuit board may be accelerated through the heat-conducting rubber pad.

Based on the above embodiment, as shown in FIG. 3, the mobile power supply further includes: a direct current (DC) output circuit 70, a Universal Serial Bus (USB) interface 80, an inverting circuit 90, an alternating current/direct current (AC/DC) interface 91 and a control apparatus 92.

As shown in FIG. 3, the DC output circuit 70 has an input end connected to the battery pack 30 and an output end connected to the USB interface 80. The inverting circuit 90 has an input end connected to the battery pack 30 and an output end connected to the AC/DC interface 91. The central processor 40 is connected to the control apparatus 92, the DC output current 70 and the inverting circuit 90 respectively, and is configured to receive a current output instruction to control the mobile power supply to output the direct current or alternating currentted. The control apparatus 92 is configured to input the current output instruction. The USB interface 80 may be one or more, and may be configured to charge a smartphone, a navigation device and others. The AC/DC interface 91 may be one or more, the voltage of the alternating current output through the AC/DC interface 91 is AC 120V/DC 150V or AC 230V/DC 300V, and a notebook computer, a table lamp or a TV and other electronic devices can be supplied with power through the AC/DC interface 91.

Based on the above embodiment, the mobile power supply further includes an Organic Light Emitting Diode (OLED) display screen 93. The OLED display screen 93 is provided on a housing of the mobile power supply, connected to the central processor 40, and configured to display residual electricity of the mobile power supply, charging power, discharging power, internal temperature and residual run time in a current charging and discharging state.

The OLED display screen has high definition and low power consumption, and is connected to the central processor 40 through a Controller Area Network (CAN) bus. To be sure, OLED display screen can be connected through other buses, such as a Serial Peripheral Interface (SPI) bus. The OLED display screen can display real-time battery power, the charging power, the discharging power, the internal temperature of the mobile power supply, residual run time estimated and other function setting menus, and provide more parameter information to a customer. It should be noted that, in the present solution, the battery power is not the collected voltage of the battery pack 30, and the capacity of the battery pack 30 is roughly determined through a contrast of the voltage. However, in fact, the capacity of the battery pack 30 will attenuate with the increase of a service time, and cannot restore to the capacity at an initial state, thereby causing the situation that a battery capacity deviation is presented while displaying the power. Therefore, a user cannot grasp the actual capacity of the battery accurately, causing undercharge or insufficient power when in use. In the present solution, the capacity of the battery pack 30 is accurately calculated by collecting the current of the charging and discharging voltage and calculating the input and output energy. Therefore, an absolute value of the residual power rather than a relative value relative to an initial capacity is calculated regardless of a new battery pack or an old battery pack, both of which can present the accurate battery information to the user directly, thereby facilitating the use.

Based on the above embodiment, the mobile power supply further includes: a wireless charging manager 94 and a wireless charging transmitter 95. The wireless charging transmitter 95 is connected to the battery pack 30, and is configured to transmit energy outputted by the battery pack 30 to the electronic device in a form of an electromagnetic wave. The wireless charging manager 94 is connected to the central processor 40 and the wireless charging transmitter 95 respectively, and is configured to receive a control instruction transmit from the central processor 40 and control the wireless charging emitter 95 according to the control instruction. The wireless charging transmitter 95 is provided on the housing of the mobile power supply (not showed in the drawings). The electronic device with a wireless charging function can be charged through the wireless charging transmitter 95 and the wireless charging manager 94, so that the mobile power supply is portable, thereby avoiding the problem of inconvenient use due to winding of connecting lines.

In the present embodiment, when the battery pack of the mobile power supply has been detached, the DC output circuit 70 and the inverting circuit 90 can be connected to the charging and discharging circuit 20 respectively, and the voltage inputted to the mobile power supply is adjusted and output to the external electronic device, so as to charge or power the electronic device. The DC output circuit 70 and the inverting circuit 90 can be connected to a wiring terminal bearing a base of the battery pack respectively, and when the battery pack is detached, the DC output circuit 70 and the inverting circuit 90 are connected to the charging and discharging circuit 20 respectively. The charging and discharging circuit in the present embodiment has the same structure with that described in Embodiment II.

According to the mobile power supply provided by the present embodiment, cooling of the mobile power supply can be accelerated through the cooling device, so that the service life of the mobile power supply can be prolonged. Moreover, through the DC output circuit and the USB interface, the mobile power supply can output the direct current, and charge or power the electronic device with the USB interface. Through the inverting circuit and the AC/DC interface, the mobile power supply can output the alternating current/direct current and charge or power the electronic device. Parameters of the mobile power supply can be displayed through the OLED display screen, so that the user can learn the parameters of the mobile power supply. Through the wireless charging transmitter and the wireless charging manager, the electronic device having the wireless charging function can be charged so that the mobile power supply is portable, thereby avoiding the problem of inconvenient use due to winding of connecting lines.

It shall be noted that, the above embodiments are only embodiments of the present disclosure and technical principle used by the same. Those skilled in the art should understand that, the present disclosure is not limited to the specific embodiments stated here. Those skilled in the art can carry out various apparent changes, readjustments and substitutions without departing from a scope of protection of the present disclosure. Therefore, although relatively detailed description is made to the present disclosure through the above embodiments, the present disclosure is not only limited to the above embodiments, and can further include other more equivalent embodiments without departing from the conception of the present disclosure, and the scope of the present disclosure is determined by a scope of claims attached.

What is claimed is:

1. A mobile power supply, comprising: a charging and discharging interface, a charging and discharging circuit, a central processor and a battery pack,
    wherein a first end of the charging and discharging interface is connected to a first end of the charging and discharging circuit, and the charging and discharging interface is configured to connect one of an external charging power supply and an electronic device requiring to be charged or supplied with power;
    a second end of the charging and discharging circuit is connected to an anode of the battery pack, and the charging and discharging circuit is configured to perform one of the following:
        adjusting a voltage inputted to the battery pack by the external charging power supply to charge the battery pack when the voltage inputted to the battery pack is not matched with a voltage of the battery pack, and adjusting a voltage output to the electronic device by the battery pack to supply power to or charge the electronic device when the voltage outputted to the electronic device is not matched with a rated voltage of the electronic device;

a cathode of the battery pack is connected to a third end of the charging and discharging circuit; and a fourth end of the charging and discharging circuit is connected to a second end of the charging and discharging interface; and the central processor is connected to a fifth end of the charging and discharging circuit, and configured to control the charging and discharging circuit to perform one of charging the battery pack, supplying power to the electronic device, and charging the electronic device.

2. The mobile power supply according to claim 1, further comprising a cooling device and a temperature sensor, wherein the cooling device is configured to cool the mobile power supply;

the temperature sensor is connected to the central processor, and configured to detect an internal temperature of the mobile power supply and transmit detected temperature signal to the central processor; and the central processor is further configured to control the cooling device according to the temperature signal received from the temperature sensor.

3. The mobile power supply according to claim 2, wherein the cooling device comprises a cooling fan and a controller, wherein the controller is connected to the central processor, and configured to receive a rotating speed control signal transmitted from the central processor and control a rotating speed of the cooling fan according to the rotating speed control signal.

4. The mobile power supply according to claim 3, wherein the charging and discharging circuit is integrated on a circuit board, and the cooing device further comprises a heat-conducting rubber pad; and the heat-conducting rubber pad is provided on the battery pack and the circuit board.

5. The mobile power supply according to claim 1, wherein the charging and discharging circuit comprises a buck-boost circuit;

the buck-boost circuit comprises a first transistor, a second transistor, a third transistor, a fourth transistor, a first gate driver, a second gate driver and an inductor;

a drain electrode of the first transistor is connected to the first end of the charging and discharging interface, a source electrode of the first transistor is connected to a first end of the inductor and a drain electrode of the second transistor respectively, and a gate electrode of the first transistor is connected to a first output end of the first gate driver;

a source electrode of the second transistor is connected to the cathode of the battery pack, and a gate electrode of the second transistor is connected to a second output end of the first gate driver;

a second end of the inductor is connected to a source electrode of the third transistor and a drain electrode of the fourth transistor respectively;

a drain electrode of the third transistor is connected to the anode of the battery pack, and a gate electrode of the third transistor is connected to a first output end of the second gate driver;

a source electrode of the fourth transistor is connected to the cathode of the battery pack, and a gate electrode of the fourth transistor is connected to a second output end of the second gate driver;

the cathode of the battery pack is grounded; and the central processor is connected to an input end of the first gate driver and an input end of the second gate driver respectively, and further configured to control, through the first gate driver, one of turn-on and turn-off of the first transistor and the second transistor, and control, through the second gate driver, one of turn-on and turn-off of the third transistor and the fourth transistor.

6. The mobile power supply according to claim 5, wherein the charging and discharging circuit further comprises a control circuit;

the control circuit comprises a first resistor, a second resistor, a third resistor, a fourth resistor, a fifth resistor, a fifth transistor, a sixth transistor and a third gate driver;

a first end of the first resistor is connected to the first end of the charging and discharging interface, and a second end of the first resistor is connected to a first end of the second resistor; a second end of the second resistor is connected to a first end of the third resistor and the cathode of the battery pack respectively; and a second end of the third resistor is connected to the second end of the charging and discharging interface;

each of the fifth transistor and the sixth transistor is arranged between the first end of the charging and discharging interface and the drain electrode of the first transistor; a drain electrode of the fifth transistor is connected to the first end of the charging and discharging interface and the first end of the first resistor respectively, and a source electrode of the fifth transistor is connected to a source electrode of the sixth transistor; and a drain electrode of the sixth transistor is connected to the drain electrode of the first transistor;

an input end of the third gate driver is connected to the central processor, and an output end of the third gate driver is connected to a gate electrode of the fifth transistor and a gate electrode of the sixth transistor respectively;

a first end of the fourth resistor is connected to the anode of the battery pack, and a second end thereof is connected to a first end of the fifth resistor; and a second end of the fifth resistor is connected to the cathode of the battery pack and the second end of the second resistor respectively;

the central processor is connected to the second end of the first resistor, the second end of the third resistor and the second end of the fourth resistor respectively, and further configured to collect a first voltage signal at the second end of the first resistor, a current signal at the second end of the third resistor and a second voltage signal at the second end of the fourth resistor, and control the third gate driver according to the first voltage signal, the current signal and the second voltage signal when the battery pack is charged by the external charging power supply, so as to control on-off of the fifth transistor and the sixth transistor; and the central processor is further configured to collect a second voltage signal at the second end of the fourth resistor and control the third gate driver according to the second voltage signal when the battery pack supplies power to or charges the electronic device, so as to control on-off of the sixth transistor and the fifth transistor.

7. The mobile power supply according to claim 6, further comprising an amplifier, which is arranged between the second end of the charging and discharging interface and the central processor, and configured to amplify the current signal.

8. The mobile power supply according to claim 6, wherein the charging and discharging circuit further comprises a voltage stabilizing component;
the voltage stabilizing component comprises a first capacitor and a second capacitor;
a first end of the first capacitor is connected to the drain electrode of the sixth transistor and the drain electrode of the first transistor respectively, and a second end of the first capacitor is connected to the cathode of the battery pack; and
a first end of the second capacitor is connected to the anode of the battery pack, the first end of the fourth resistor and the drain electrode of the third transistor respectively; and a second end of the second capacitor is connected to the cathode of the battery pack.

9. The mobile power supply according to claim 1, wherein the central processor is connected to a third end of the charging and discharging interface, and configured to acquire parameter information of the electronic device and identify a category of the electronic device according to the parameter information when the external electronic device is supplied with power or charged by the battery pack.

10. The mobile power supply according to claim 1, further comprising a direct current (DC) output circuit, a universal serial bus (USB) interface, an inverting circuit, an alternating current/direct current (AC/DC) interface and a control apparatus;
an input end of the DC output circuit is connected to the battery pack, and an output end of the DC output circuit is connected to the USB interface;
an input end of the inverting circuit is connected to the battery pack, and an output end of the inverting circuit is connected to the AC/DC interface;
the central processor is connected to the control apparatus, the DC output current and the inverting circuit respectively, and configured to receive a current output instruction to control the mobile power supply to output a direct current or an alternating current; and
the control apparatus is configured to input the current output instruction.

11. The mobile power supply according to claim 1, further comprising an Organic Light-Emitting Diode (OLED) display screen provided on a housing of the mobile power supply, wherein the OLED display screen is connected to the central processor, and configured to display residual electricity of the mobile power supply, charging power, discharging power, internal temperature and residual run time in a current charging and discharging state.

12. The mobile power supply according to claim 1, further comprising: a wireless charging manager and a wireless charging transmitter,
wherein the wireless charging transmitter is connected to the battery pack, and configured to transmit energy outputted by the battery pack to the electronic device in a form of electromagnetic wave; and
the wireless charging manager is connected to the central processor and the wireless charging transmitter respectively, and configured to receive a control instruction transmitted by the central processor and control the wireless charging transmitter according to the control instruction.

* * * * *